(12) United States Patent  
Fukasawa et al.

(10) Patent No.: US 9,306,221 B2  
(45) Date of Patent: Apr. 5, 2016

(54) FUEL ELECTRODES FOR SOLID OXIDE ELECTROCHEMICAL CELL, PROCESSES FOR PRODUCING THE SAME, AND SOLID OXIDE ELECTROCHEMICAL CELLS

(71) Applicant: KABUSHIKI KAISHA TOSHIBA, Minato-ku, Tokyo (JP)

(72) Inventors: Takayuki Fukasawa, Tokyo (JP); Keizo Shimamura, Tokyo (JP); Yoshio Hanakata, Tokyo (JP); Masato Yoshino, Tokyo (JP); Kentaro Matsunaga, Tokyo (JP); Tsuneji Kameda, Tokyo (JP); Yoshiyasu Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 234 days.

(21) Appl. No.: 13/804,323

(22) Filed: Mar. 14, 2013

(65) Prior Publication Data

US 2013/0196246 A1  Aug. 1, 2013

Related U.S. Application Data

(60) Continuation of application No. 13/756,726, filed on Feb. 1, 2013, and a division of application No. 12/204,982, filed on Sep. 5, 2008, now abandoned.

(30) Foreign Application Priority Data

Sep. 5, 2007 (JP) .................................. 2007-230747

(51) Int. Cl.
 *H01M 4/90* (2006.01)
 *H01M 4/86* (2006.01)
 (Continued)

(52) U.S. Cl.
 CPC .......... *H01M 4/9041* (2013.01); *H01M 4/8621* (2013.01); *H01M 4/881* (2013.01); *H01M 4/8885* (2013.01); *H01M 4/9025* (2013.01); *H01M 4/9075* (2013.01);
 (Continued)

(58) Field of Classification Search
 None
 See application file for complete search history.

(56) References Cited

U.S. PATENT DOCUMENTS 5,702,837 A    12/1997  Xue  
6,048,636 A *   4/2000  Naoumidis et al. ........... 429/452

(Continued)

FOREIGN PATENT DOCUMENTS

JP   06-111829   4/1994  
JP   07-105956   4/1995

(Continued)

OTHER PUBLICATIONS

U.S. Office Action mailed on Jan. 5, 2012 corresponding to U.S. Appl. No. 12/204,982, filed Sep. 5, 2008.

(Continued)

*Primary Examiner* — Melvin C Mayes  
*Assistant Examiner* — Sheng H Davis  
(74) *Attorney, Agent, or Firm* — Amin, Turocy & Watson, LLP

(57) ABSTRACT

A fuel electrode for a solid oxide electrochemical cell includes: an electrode layer constituted of a mixed phase including an oxide having mixed conductivity and another oxide selected from the group including an aluminum-based oxide and a magnesium-based composite oxide, said another oxide having, supported on a surface part thereof, particles of at least one member selected from nickel, cobalt, and nickel-cobalt alloys.

14 Claims, 8 Drawing Sheets

(51) Int. Cl.
  *H01M 4/88* (2006.01)
  *H01M 8/02* (2006.01)
  *H01M 8/10* (2006.01)
  *H01M 8/12* (2006.01)

(52) U.S. Cl.
  CPC ......... *H01M 8/0202* (2013.01); *H01M 8/0232* (2013.01); *H01M 8/0245* (2013.01); *H01M 8/1004* (2013.01); *H01M 8/1016* (2013.01); *H01M 8/1226* (2013.01); *H01M 2008/1293* (2013.01); *Y02E 60/521* (2013.01); *Y02E 60/525* (2013.01); *Y02P 70/56* (2015.11)

(56) References Cited

U.S. PATENT DOCUMENTS

| | | | |
|---|---|---|---|
| 6,099,985 | A | 8/2000 | Elangovan et al. |
| 6,344,426 | B1 | 2/2002 | Hata et al. |
| 6,692,855 | B1 * | 2/2004 | Aizawa et al. ............... 429/479 |
| 7,655,346 | B2 * | 2/2010 | Sato et al. ................... 429/425 |
| 8,252,478 | B2 | 8/2012 | Larsen et al. |
| 2004/0168367 | A1 | 9/2004 | Suenaga et al. |
| 2004/0202919 | A1 * | 10/2004 | Mardilovich et al. ........... 429/44 |
| 2005/0019636 | A1 | 1/2005 | Kwon et al. |
| 2006/0127747 | A1 | 6/2006 | Arico et al. |
| 2007/0148521 | A1 * | 6/2007 | Ukai et al. ..................... 429/33 |
| 2009/0068523 | A1 | 3/2009 | Fukasawa et al. |
| 2013/0149438 | A1 | 6/2013 | Fukasawa et al. |
| 2013/0196246 | A1 | 8/2013 | Fukasawa et al. |

FOREIGN PATENT DOCUMENTS

| | | |
|---|---|---|
| JP | 10-125333 | 5/1998 |
| JP | 2000-133280 | 5/2000 |
| JP | 2003-242985 | 8/2003 |
| JP | 2009-64640 | 3/2009 |
| JP | 2013-175479 | 9/2013 |

OTHER PUBLICATIONS

U.S. Office Action mailed on Aug. 3, 2012 corresponding to U.S. Appl. No. 12/204,982, filed Sep. 5, 2008.

Japanese Office Action for Japanese Application No. 2007-230747 mailed on Oct. 19, 2012.

Non-Final Office Action for U.S. Appl. No. 13/756,726 dated Apr. 23, 2015, 23 pages.

Office Action for U.S. Appl. No. 13/756,726 dated Nov. 9, 2015, 6 pages.

Office Action for U.S. Appl. No. 13/756,726 dated Apr. 23, 2015, 23 pages.

Japanese Office Action for Japanese Patent Application No. 2014-180607 mailed Jul. 3, 2015.

* cited by examiner (a) BEFORE REDUCTION (b-1) AFTER REDUCTION (b-2) A-A' SECTION

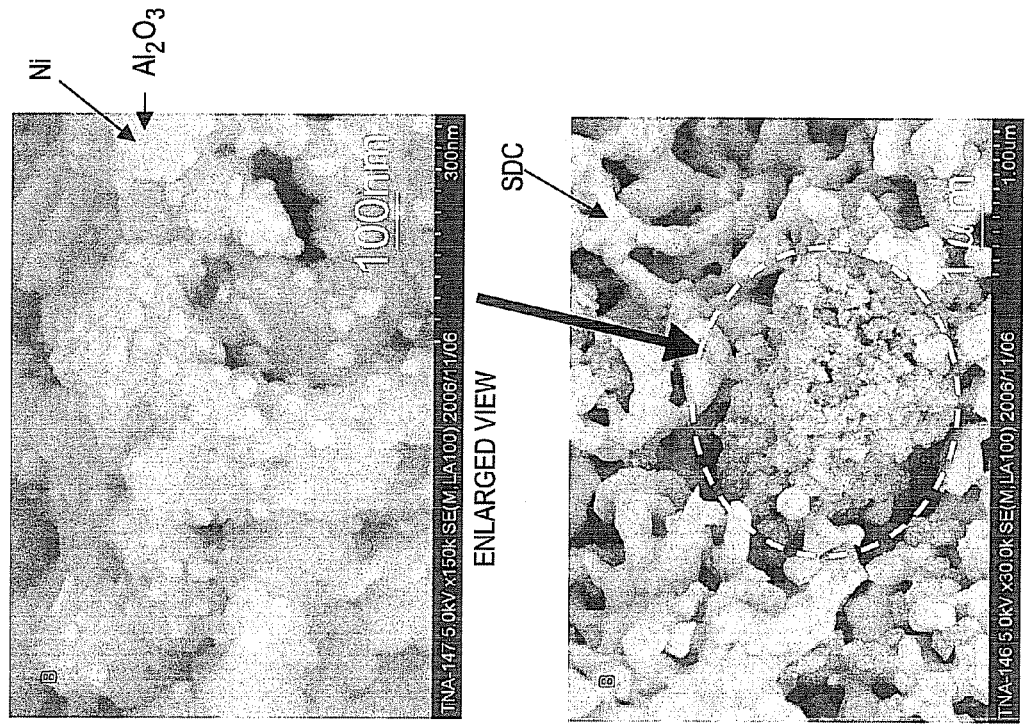
FIG.6C ENLARGED VIEW
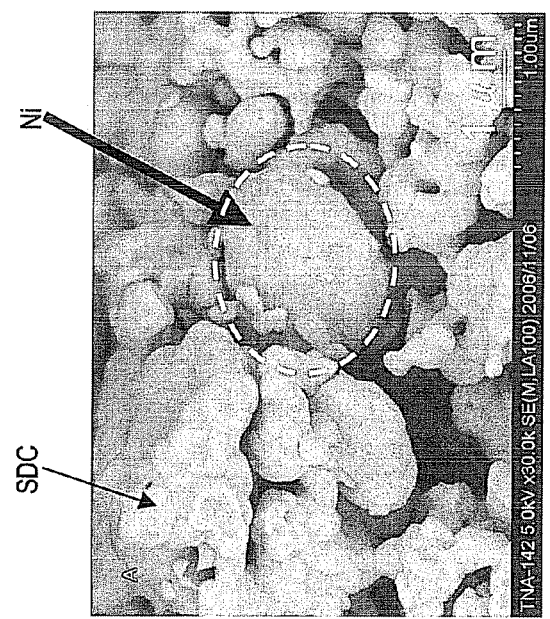
FIG.6B EXAMPLE 2
FIG.6A COMPARATIVE EXAMPLE 1

FUEL ELECTRODES FOR SOLID OXIDE ELECTROCHEMICAL CELL, PROCESSES FOR PRODUCING THE SAME, AND SOLID OXIDE ELECTROCHEMICAL CELLS

CROSS-REFERENCE TO RELATED APPLICATIONS

This application is a Continuation of U.S. patent application Ser. No. 13/756,726 filed Feb. 1, 2013, which is a Division of U.S. patent application Ser. No. 12/204,982 filed Sep. 5, 2008, now abandoned, the entire contents of both of which are incorporated herein by reference.

This application is based upon and claims the benefit of priority from the prior Japanese Patent Application No. 2007-230747, filed on Sep. 5, 2007, the entire contents of which are incorporated herein by reference.

BACKGROUND OF THE INVENTION

1. Field

The present invention relates to solid oxide electrochemical cells such as, e.g., a solid oxide fuel cell (SOFC) and a solid electrolyte high-temperature steam electrolysis cell (SOEC), fuel electrodes for use in the cells, and processes for producing the electrodes.

2. Description of the Related Art

A solid oxide fuel cell (SOFC) has an operating temperature as high as about 700° C.-1,000° C. and hence a high power generation efficiency, and is reduced in $CO_2$ generation. This fuel cell is hopeful as a next-generation clean power generation system.

With respect to fuel electrode materials for solid electrolyte fuel cells, a technique has been disclosed in which SDC ($CeO_2$ doped with $Sm_2O_3$) particles having electron/oxygen ion mixed conductivity are used to highly dispersedly deposit fine particles of nickel on the surface of the SDC particles (see *J. Electrochem. Soc.*, 141, [2], 342-346, 1994).

In this technique, nickel particles are formed in a porous material constituted of an SDC network by the impregnation method using, e.g., an aqueous metal salt solution. This technique has succeeded in reducing the size of nickel particles by at least one order of magnitude and in obtaining high catalytic activity with a smaller nickel addition amount. In addition, since SDC further has electronic conductivity, the boundary between each of all the fine nickel particles and the SDC theoretically functions as a three-phase interface. There is a description in that document to the effect that bonding between the nickel and the SDC is relatively satisfactory. However, because nickel particles are formed by impregnation with the solution, burning, and reduction, the particles change in size with time or the particles unite/aggregate with one another during the burning step, resulting in an uneven structure.

Furthermore, techniques concerning the use of $NiAl_2O_4$ in a fuel electrode have been disclosed, which include the use of a system including $NiAl_2O_4$ and NiO (see Japanese Patent No. 3327789) and the use of a system including nickel as a main component and further including $NiAl_2O_4$ (see JP-A 2003-242985). Moreover, a technique in which a solid solution between NiO and $MgAl_2O_4$ is mixed with YSZ to form an electrode and this electrode is reduced to precipitate nickel has been disclosed (see JP-A 7-105956). There also is a technique in which an NiO—MgO solid solution is used in a fuel electrode (see JP-A 6-111829).

For reducing overvoltage and increasing catalytic activity in a fuel electrode, it is necessary to use finer metal particles as a catalyst and thereby increase the number of active sites. However, in a high-temperature reducing atmosphere, the metal particles are apt to readily move, grow, and aggregate. Furthermore, it is difficult to incorporate nickel particles in an unnecessarily large amount partly because of a difference in the coefficient of thermal expansion. In addition, in case where abrupt oxidation has occurred, the formation of an oxide results in volume expansion and leads to the fear of causing cell breakage.

BRIEF SUMMARY OF THE INVENTION

According to the embodiments of the invention, examples of oxides having, supported on a surface part thereof, particles of at least one member selected from nickel, cobalt, and nickel-cobalt alloys include an aluminum-based oxide (a first aspect) and a magnesium-based composite oxide (a second aspect).

The invention may provide, according to a first aspect thereof, a fuel electrode for a solid oxide electrochemical cell, the fuel electrode comprising: an electrode layer comprising a mixed phase constituted of an oxide having mixed conductivity and an aluminum-based oxide having, supported on a surface part thereof, particles of at least one member selected from nickel, cobalt, and nickel-cobalt alloys; a meshy wiring formed on a surface layer part of the electrode layer and comprising a material having higher electronic conductivity than the electrode layer; and a current collector which is in contact with the wiring.

The invention may provide, according to a second aspect thereof, a fuel electrode for a solid oxide electrochemical cell, the fuel electrode comprising: an electrode layer comprising a mixed phase constituted of an oxide having mixed conductivity and a magnesium-based composite oxide having, supported on a surface part thereof, particles of at least one member selected from nickel, cobalt, and nickel-cobalt alloys; a meshy wiring formed on a surface layer part of the electrode layer and comprising a material having higher electronic conductivity than the electrode layer; and a current collector which is in contact with the wiring.

The invention may provide, according to a third aspect thereof, a solid oxide electrochemical cell including: a solid electrolyte plate having oxygen ion conductivity; the fuel electrode according to the first or second aspect of the invention formed on one side of the solid electrolyte plate; and an air electrode formed on the other side of the solid electrolyte plate, the air electrode comprising a composite oxide represented by $Ln_{1-x}A_xBO_{3-\delta}$ (wherein Ln is a rare-earth element; A is Sr, Ca, or Ba; and B is at least one of Cr, Mn, Fe, Co, and Ni) or comprising a composite phase constituted of that composite oxide and any one of $CeO_2$ doped with $Sm_2O_3$, $CeO_2$ doped with $Gd_2O_3$, and $CeO_2$ doped with $Y_2O_3$.

The invention may provide, according to a fourth aspect thereof, a process for producing a fuel electrode for a solid oxide electrochemical cell, the process comprising the steps of: producing a mixture of oxide particles having mixed conductivity and nickel-aluminum composite oxide particles, cobalt-aluminum composite oxide particles, or composite oxide particles composed of a nickel-aluminum composite oxide and a cobalt-aluminum composite oxide; superposing a layer of the mixture on a surface of a solid electrolyte and sintering the mixture layer; and reducing the resultant sinter at a temperature of from 800° C. to 1,000° C.

The invention may provide, according to a fifth aspect thereof, a process for producing a fuel electrode for a solid oxide electrochemical cell, the process comprising the steps of: producing a mixture of oxide particles having mixed conductivity and nickel-magnesium composite oxide particles, cobalt-magnesium composite oxide particles, or composite oxide particles composed of a nickel-magnesium composite oxide and a cobalt-magnesium composite oxide; superposing a layer of the mixture on a surface of a solid electrolyte and sintering the mixture layer; and reducing the resultant sinter at a temperature of from 800° C. to 1,000° C.

According to the embodiments of the invention, fuel electrodes having high catalytic activity and high durability can be provided, and solid oxide electrochemical cells which are stable and have excellent output performance can be realized. Furthermore, inexpensive production techniques such as screen printing and spray coating are applicable, whereby the fuel electrodes can be produced at low cost.

BRIEF DESCRIPTION OF THE DRAWINGS

FIGS. 6A, 6B and 6C are SEM photographs of reduced $NiAl_2O_4$ in an Example according to the first embodiment and of a Comparative Example.

DETAILED DESCRIPTION OF THE INVENTION

Figure 1:
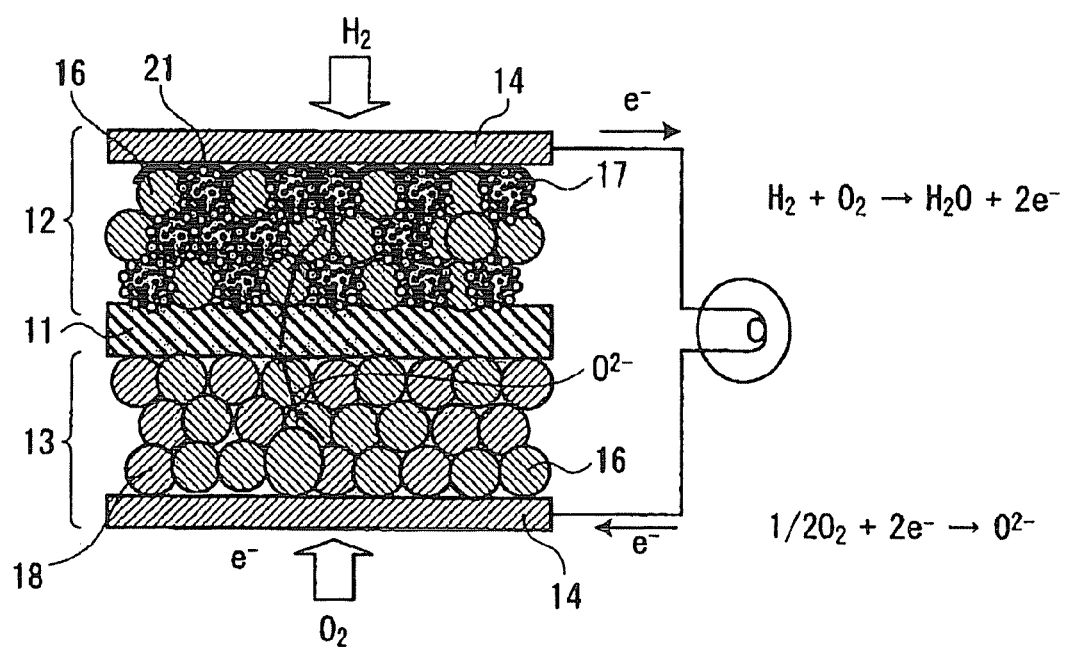
FIG. 1 is a diagrammatic sectional view illustrating the structure of a solid oxide fuel cell (SOFC) according to a first embodiment of the invention.

The solid oxide fuel cells, fuel electrodes for use therein, and processes for fuel electrode production according to the embodiments of the invention are explained below. However, the invention should not be construed as being limited to the following embodiments and Examples. The diagrammatic views which are referred to in the following explanations are for illustrating the positional relationship between constituents, and the size of the particles, the thickness ratio among the layers, etc. do not always coincide with actual ones.

First Embodiment

A first embodiment of the invention relates to the fuel electrode according to the first aspect of the invention, the process for producing this fuel electrode, and the solid oxide fuel cell employing this fuel electrode.

First, the solid oxide fuel cell according to this embodiment is explained by reference to the diagrammatic sectional view of FIG. 1. This fuel cell has a multilayer structure composed of a solid electrolyte plate 11, a fuel electrode material 12 disposed on one side of the plate 11, and an air electrode material 13 disposed on the other side thereof.

The air electrode 13 includes a composite oxide 18 which is an oxide showing mixed conductivity and represented by the general formula $Ln_{1-x}A_xBO_{3-\delta}$ (wherein Ln is a rare-earth element; A is Sr, Ca, or Ba; and B is at least one of Cr, Mn, Fe, Co, and Ni). The composite oxide 18 efficiently dissociates oxygen and has electronic conductivity. The composite oxide is slightly deficient in ionic conductivity. This deficiency may be compensated for by further adding an ionically conductive oxide 16. As this ionically conductive oxide, use is made of any one of $CeO_2$ doped with $Sm_2O_3$, $CeO_2$ doped with $Gd_2O_3$, and $CeO_2$ doped with $Y_2O_3$. Such oxides are materials which show mixed conductivity in a reducing atmosphere but show high ionic conductivity in an oxygen-containing atmosphere and which do not react with that oxide showing mixed conductivity. The term "mixed conductivity" herein means a property simultaneously showing electronic conductivity and oxygen ion conductivity.

It is likewise thought that a reaction can take place also at the interface between the air electrode 13, which contains the composite oxide 18 having mixed conductivity, and the solid electrolyte plate 11. It is therefore preferred to form beforehand a thin and dense reaction-preventive layer at the interface between the solid electrolyte plate 11 and the air electrode 13 in order to inhibit the reaction. As a material for forming the reaction-preventive layer also, a ceria-based ion conductor is effective. A thickness of about 1 μm suffices for this layer.

Oxygen ions ($O^{2-}$) formed by dissociation in the air electrode 13 pass through the solid electrolyte 11 and move to the fuel electrode side, where the oxygen ions react with hydrogen to yield water. Electrons generate upon this reaction and are taken out through an external circuit to conduct power generation.

The dissociation of oxygen on the air electrode 13 side and the reaction of hydrogen with oxygen ions on the fuel electrode 12 side each occur at those three-phase interfaces in the electrode where all of the catalyst, oxygen ion conductor, and feed gas, are present. Because of this, how to form such three-phase interfaces in a larger amount is an important subject.

In general fuel electrodes 12 heretofore in use, a cermet obtained by mixing nickel particles functioning as a catalyst and having electronic conductivity with stabilized zirconia having oxygen ion conductivity (such as YSZ) and sintering the mixture has been employed. The nickel particles to be used for constituting this cermet are produced by reducing NiO and, hence, generally have a size of from several hundred nanometers to several micrometers, which is close to the size of the NiO particles used as a raw material. In the conventional technique, the nickel particles having such a size are connected to one another to constitute a network for electron conduction.

A measure which is thought to be effective in improving catalytic activity is to reduce the size of nickel particles to thereby increase the specific surface area. It is actually known that a fuel electrode produced using nickel particles having a reduced particle diameter obtained by a method in which nickel particles are precipitated from a solution of, e.g., a nitric acid salt or a method in which particles are mechanically pulverized as in the production of mechanical alloys shows high catalytic activity.

However, to reduce metal particles into finer particles results in a higher tendency to particle growth due to nickel particle sintering although it heightens activity. In addition, in a high-temperature reducing atmosphere, metal particles readily move. When the temperature is high, there has been a problem that metal particles move to a surface layer part and an inner part of the electrode increases in resistance. For overcoming such a problem, it is necessary to take a measure in reducing the particle diameter of the catalyst and simultaneously inhibiting nickel movement/aggregation and thereby preventing internal resistance from increasing. Moreover, in case where nickel is added in an increased amount in order to heighten catalytic activity, this results in an increase in the coefficient of thermal expansion to form a cause of breakage of the cell itself. Because of this, the amount of nickel is generally regarded as up to about 60% by weight at the most.

The present inventors diligently made investigations in order to eliminate those problems. As a result, it has been found that a technique in which a composite oxide solid solution (catalyst precursor) containing a metal functioning as an electrode catalyst is used to constitute an electrode beforehand and then reduced to form metal particles as a precipitate from the solid solution is effective in reducing the size of particles and fixing the particles to a base.

On the other hand, the nickel particles precipitated by reduction are fine but are discontinuously present on the insulator. It was thought that because of such state of the nickel particles, the resistance of contact with a current collector member is high. It has been found that to form beforehand a meshy wiring having electronic conductivity in a surface layer part of the electrode in order to compensate for a deficiency in electronic conductivity is effective in inhibiting the contact resistance of the fuel electrode from increasing due to current collection.

Namely, as shown in FIG. 1, the fuel electrode 12 according to the first embodiment includes a mixed phase (electrode layer) constituted of an oxide 16 having mixed conductivity and an aluminum-based oxide 17 having, supported on a surface part thereof, particles of at least one member selected from nickel, cobalt, and nickel-cobalt alloys. This fuel electrode 12 further includes: a wiring 21 formed on a surface layer part of the electrode layer and made of a material having higher electronic conductivity than the electrode layer; and a current collector 14 electrically connected to the wiring 21.

Figure 2:
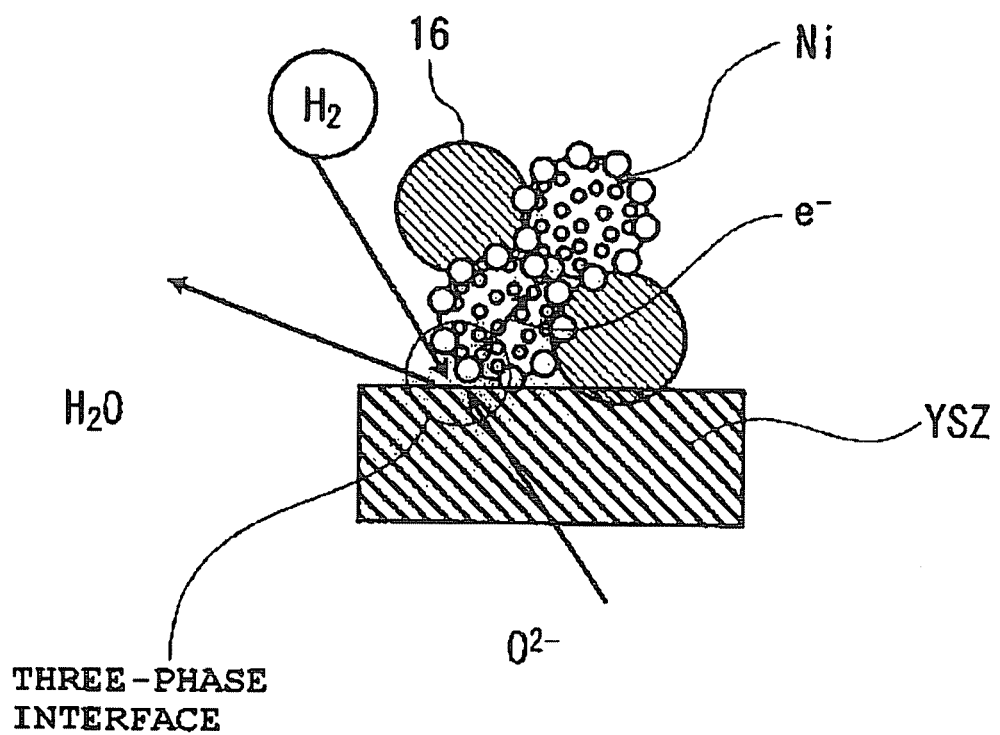
FIG. 2 is a diagrammatic sectional view illustrating a three-phase interface in a fuel electrode according to the first embodiment.

FIG. 2 is a diagrammatic view of a three-phase interface in the fuel electrode 12. This figure diagrammatically illustrates a reaction occurring at an interface where the catalyst Ni, material having mixed conductivity (e.g., YSZ constituting the electrolyte plate 11 or SDC as the oxides having mixed conductivity in the oxygen-ion-conductor particles), and feed gas $H_2$ exist.

A process for producing this fuel electrode 12 is explained below.

Figure 3:
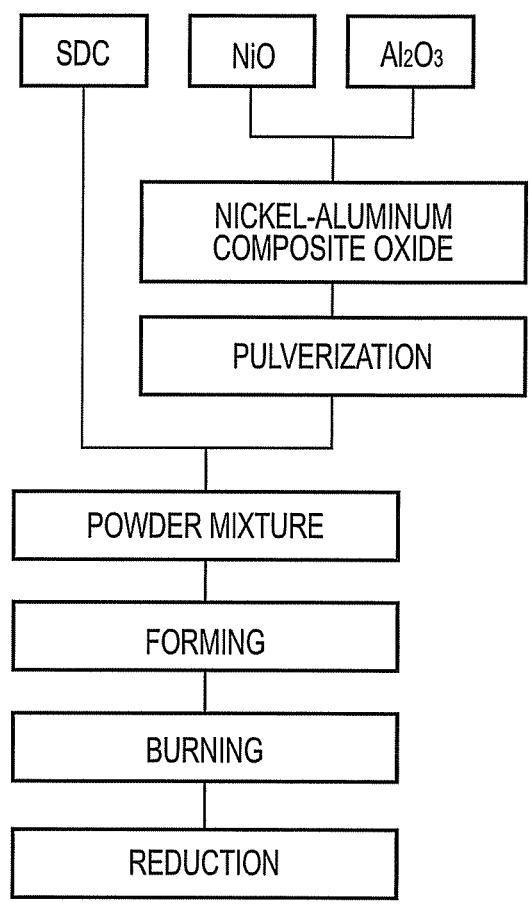
FIG. 3 is a flowchart showing steps for producing the fuel electrode according to the first embodiment.
Figure 4:
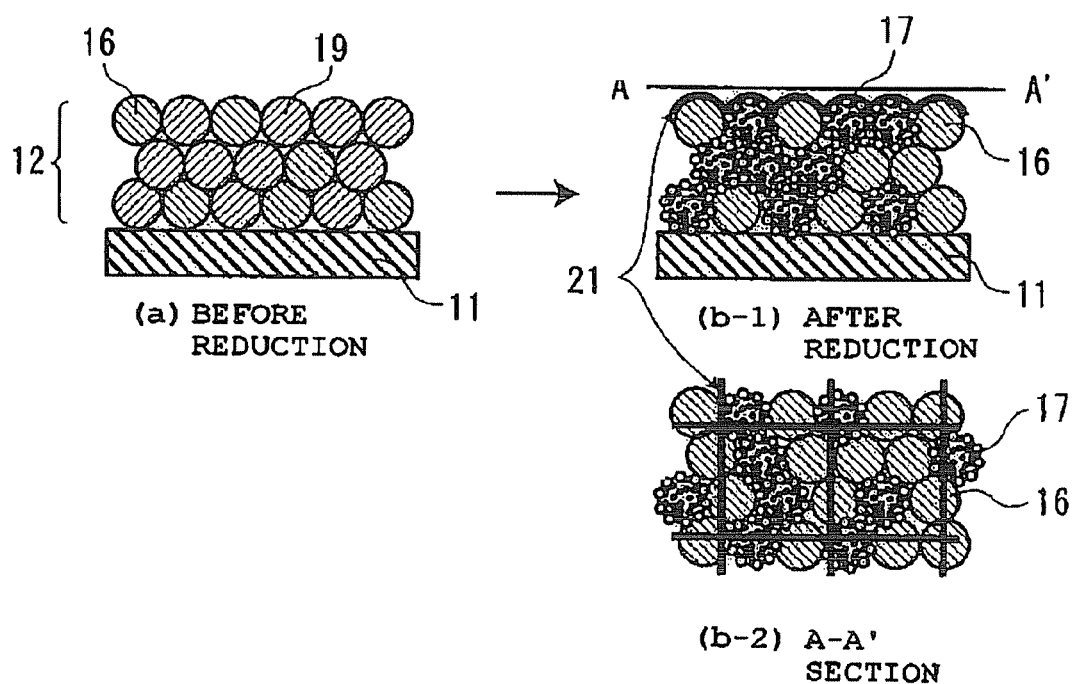
FIG. 4 is diagrammatic sectional views and a diagrammatic plan view which illustrate structures obtained in steps for producing the fuel electrode according to the first embodiment.

An example of production steps in this embodiment is shown in FIG. 3, and diagrammatic views of electrode structures are shown in FIG. 4.

First, an NiO powder is mixed with an $Al_2O_3$ powder, and the mixture is burned to produce a nickel-aluminum composite oxide solid solution represented by $NiAl_2O_4$. This solid solution is pulverized and used as particles 19. The powder thus obtained by pulverization has a particle diameter of preferably about 0.5-20 μm. For producing such a powder, use may be made of a method in which an aqueous solution of a metal salt such as, e.g., a nitrate, is used to mix the ingredients and the mixture is pyrolyzed and burned to produce the target powder.

Subsequently, the composite oxide solid-solution particles 19 thus produced are mixed with particles 16 having electron/ion mixed conductivity, and water is added thereto to obtain a paste. Examples of the particles 16 having mixed conductivity to be used include $CeO_2$ doped with $Sm_2O_3$, $CeO_2$ doped with $Gd_2O_3$, and $CeO_2$ doped with $Y_2O_3$. However, the particles 16 should not be construed as being limited to these, and any particles having high oxygen ion conductivity and high electronic conductivity at temperatures of from 700° C. to 1,000° C. may be used.

The powder mixture in a paste form is then applied to a surface of a solid electrolyte plate 11 by screen printing, and the coating is burned by heating to a temperature which results in an elevated strength of bonding between the plate 11 and the coating. In general, it is preferred to burn the coating at a temperature in the range of from 1,200° C. to 1,400° C. Methods for disposing particles 16 having mixed conductivity and composite oxide solid-solution particles 19 on a solid electrolyte plate 11 should not be construed as being limited to the method described above. Use may be made of a method in which the powder mixture is slurried and this slurry is applied by roller coating, dipping, or spray coating to produce the target structure. Alternatively, the slurry may be formed into a sheet and then superposed.

In FIG. 4, the particles 16 and 19 are exaggeratingly illustrated for easy understanding. However, the actual particles have been bonded together and united because of sintering and constitute a network. From the standpoint of gas diffusibility in the electrode, it is preferred that the electrode layer should be porous. A pore-forming material which disappears upon burning to form pores may be incorporated beforehand. Examples of the pore-forming material include organic ones such as, e.g., acrylic spherical particles.

A processing for heightening the efficiency of current collection, which is a feature of this embodiment, is further conducted. In a final material constitution, metal particles functioning as a catalyst and having electronic conductivity are fine particles which are isolated and dispersed. It is therefore necessary to take a measure for securing sufficient contact with a current collector 14. In ordinary techniques, a material capable of serving as a current collector, such as a metal mesh, is pushed against the electrode to establish contact. In this embodiment, however, a meshy wiring 21 is formed on the electrode layer by printing with a material having higher electronic conductivity than the electrode layer, and this meshy wiring is brought into contact with a current collector 14 to thereby secure current collection (FIGS. 4 (b-1) and (b-2)).

A line width of about 30 μm and a line-to-line distance of about 500 μm suffice for the wiring 21. This wiring 21 exerts almost no influence on fuel diffusion. Although the line width, line-to-line distance, and wiring pattern are not limited to these, it is preferred that the area occupied by the wiring part should account for up to 40% of the whole electrode surface. As a material for forming the wiring through printing, a mixture of a metal such as Pt, Au, Ni, Co, or Fe and a material having mixed conductivity, such as SDC or GDC, to be simultaneously used in the electrode layer is used in the form of a paste. The two ingredients are mixed preferably in such a ratio that the proportion of the metal is 40-90 vol % based on the whole. This is because not only such a mixing ratio improves tight contact and adhesion to the electrode layer but also the wiring itself can be expected to function as a catalyst.

The printed wiring part is burned. Thereafter, the fuel electrode 12 is subjected to a reduction treatment in a reducing atmosphere having a temperature of from 800° C. to 1,000° C. Ordinary NiO reduction treatments are conducted at a temperature of about 900° C. without using an unnecessarily high temperature. However, in this embodiment, in which $NiAl_2O_4$ is used as a main component, it is more preferred to conduct the reduction at 950° C. or higher for the purpose of sufficiently precipitating nickel. Although the period of reduction is not particularly limited, about 10 minutes may suffice.

Through the reduction, the nickel ingredient present in the solid solution state in the $NiAl_2O_4$ part 19 precipitates on the surface to give a base made of an aluminum oxide 17 (mainly $Al_2O_3$). Namely, nickel-particle-supporting $Al_2O_3$ 17 is formed. The fine metal particles thus formed have a size of generally tens of nanometers. From the standpoint of enabling the fine metal particles to have high catalytic activity, the size thereof is preferably about from 5 nm to 200 nm. Metal particles having a size smaller than 5 nm are difficult to produce actually. Metal particles larger than 200 nm are apt to bond to adjoining ones and this may pose the same problem as in the conventional technique in which NiO is used after having been reduced. A more preferred range of the size of the fine metal particles as a catalyst is about from 20 nm to 100 nm. This size is smaller than the conventional electrode catalyst sizes by one to two orders of magnitude. An improvement in catalytic activity is hence expected. Consequently, the amount of the $NiAl_2O_4$ to be added is preferably in the range of from 5% by weight to 50% by weight based on all materials constituting the electrode layer. More preferably, the amount thereof is from 10% by weight to 30% by weight.

According to this embodiment, a reduction in catalyst amount can be attained and, hence, the proportion of the material having mixed conductivity can be increased. Consequently, the difference in thermal expansion between the electrode layer and the solid electrolyte and the difference due to conformation mismatch can be further reduced.

The metal particles precipitated are present on a surface part of the $Al_2O_3$ as a base so as to form only one layer. These particles have satisfactory conformability to the base and are tenaciously bonded thereto. Consequently, the metal particles are characterized in that even when exposed to a high-temperature reducing atmosphere, the particles do not readily move.

In addition, since the metal particles are fine and isolated, this fuel electrode has an advantage that even when the electrode layer undergoes abrupt oxidation, the resultant volume expansion is only local and is less apt to lead to breakage.

In each of Japanese Patent No. 3327789 and JP-A 2003-242985, $NiAl_2O_4$ is added for the purposes of imparting the same coefficient of thermal expansion as the YSZ used as a solid electrolyte and of inhibiting the nickel particles from growing or aggregating. These documents include no statement at all concerning the technique of precipitating fine nickel particles from the $NiAl_2O_4$. On the other hand, in JP-A 7-105956, YSZ is added in an amount of about 10 vol % and there is a possibility that such a YSZ amount might be too small to sufficiently secure oxygen ion conductivity.

As described above, in producing a fuel electrode according to this embodiment, fine nickel particles can be fixed to a base. In addition, according to this fuel electrode, high activity and long-term stability can be provided with a small nickel addition amount. When this fuel electrode is used in combination with an air electrode employing a preferable electrode catalyst, inexpensive high-output cells which may be not only a flat cell but also a cylindrical or electrode-supported cell or the like can be realized.

The nickel-particle-supporting $Al_2O_3$ produced by reducing $NiAl_2O_4$ is usable also as a catalyst for the reforming of hydrocarbon fuels including methane. Namely, it is applicable to a variety of fuels.

This embodiment is explained below in more detail by reference to the following Examples. Electrodes employing $Sm_2O_3$-doped $CeO_2$ as particles having mixed conductivity, ones employing $Gd_2O_3$-doped $CeO_2$ as particles having mixed conductivity, and ones employing $Y_2O_3$-doped $CeO_2$ as particles having mixed conductivity all showed the same tendency. Consequently, in the following Examples, cells employing $Sm_2O_3$-doped $CeO_2$ as the only example are explained. The particle diameter and other properties of each of the powders used should not be construed as being limited to those shown below.

<Solid Electrolyte>

In all Examples and Comparative Examples, YSZ ($ZrO_2$ stabilized with 8 mol % $Y_2O_3$) processed so as to have a diameter of 15 mm and a thickness of 500 µm was used as a solid electrolyte.

In all Examples and Comparative Examples, that solid electrolyte plate was used, and a porous platinum electrode was used as an air electrode.

Comparative Example 1

An NiO powder having an average particle diameter of about 1 µm and an SDC powder ($Sm_{0.2}Ce_{0.8}O_2$) having an average particle diameter ($D_{50}$) of about 0.3 µm were weighed out in such amounts as to result in a weight ratio of 50:50. Pure water was added to the powders in an amount of about 50% based on the total weight thereof. The resultant mixture was treated with a high-speed rotary mixer to obtain a paste. Using a screen printer, the paste was printed in a size with a diameter of 6 mm on a central part of a YSZ solid electrolyte plate. After the printing, the solid electrolyte plate was placed in an atmospheric furnace and the paste was burned at 1,300° C. for 2 hours. Thereafter, a platinum electrode likewise having a diameter of 6 mm was deposited on the opposite side by screen printing and burned at 950° C. for 1 hour to obtain an air electrode.

Comparative Example 2

A nickel paste containing SDC particles (in such an amount as to result in an SDC/Ni ratio of 50:50 by weight) was produced. This nickel paste was applied to the fuel electrode of the sample produced in Comparative Example 1, by screen printing through a screen mesh produced so as to give a wiring having a line width of about 30 µm and a line-to-line distance of about 500 µm.

Comparative Example 3

A sample was produced under the same conditions as in Comparative Example 1, except that the NiO powder and the SDC powder were mixed in a ratio of 30:70 by weight. The same meshy wiring as that shown in Comparative Example 2 was formed by printing on a surface layer part of the fuel electrode produced.

Examples 1 to 3

An NiO powder having an average particle diameter of about 1 µm and an $Al_2O_3$ powder having an average particle diameter of about 0.4 µm were weighed out in such amounts as to result in a molar ratio of 1:1. The powders were mixed together by means of a mortar. The resultant powder mixture was press-molded, and the molding was sintered at 1,300° C. of 5 hours in the air. The constituent phases of the sinter obtained were examined by X-ray diffractometry.

Subsequently, the sinter was pulverized and passed through a 40-µm mesh sieve to obtain a starting powder (nickel-aluminum composite oxide). The pulverized composite oxide particles were mixed with SDC ($Sm_{0.2}Ce_{0.8}O_2$) particles having an average particle diameter of 0.3 μm in each of such ratios as to result in pulverized-particle proportions of 8, 20, and 50% by weight. Thus, respective powder mixtures were prepared (Examples 1 to 3).

To each of the powder mixtures was added about 40% by weight pure water. The resultant mixtures each were treated with a high-speed rotary mixer to obtain pastes. Using a screen printer, each paste was printed in a size with a diameter of 6 mm on a central part of a YSZ solid electrolyte plate. After the printing, the solid electrolyte plates were placed in an atmospheric furnace and the pastes were burned at 1,300° C. for 2 hours. Subsequently, a platinum electrode was likewise deposited by printing on the opposite side of each solid electrolyte plate and burned at 950° C. for 1 hour to obtain an air electrode. The same meshy wiring as that shown in Comparative Example 2 was formed by printing on a surface layer part of each fuel electrode produced.

Comparative Example 4

The same structure as that produced in Example 2 was produced, except that the meshy wiring on the surface layer part was omitted. Thus, the structure of Comparative Example 4 was prepared.

Examples 4 and 5

Samples were produced in the same manner as in Examples 1 to 3, except that the proportions of the nickel-aluminum composite oxide particles were changed to 3 or 55% by weight (Examples 4 and 5, respectively). The same meshy wiring as that shown in Comparative Example 2 was formed by printing on a surface layer part of each fuel electrode produced.

Example 6

A CoO powder having an average particle diameter of about 1 μm and an $Al_2O_3$ powder having an average particle diameter of about 0.4 μm were weighed out in such amounts as to result in a molar ratio of 1:1. The powders were mixed together by means of a mortar. The resultant powder mixture was press-molded, and the molding was sintered at 1,300° C. of hours in the air. The constituent phases of the sinter obtained were examined by X-ray diffractometry.

Subsequently, the sinter was pulverized and passed through a 40-μm mesh sieve to obtain a starting powder (cobalt-aluminum composite oxide). The pulverized composite oxide particles were mixed with SDC particles having an average particle diameter of 0.3 μm in such a ratio as to result in a pulverized-particle proportion of 20% by weight. Thus, a powder mixture was prepared. To the powder mixture was added about 40% by weight pure water. The resultant mixture was treated with a high-speed rotary mixer to obtain a paste. Using a screen printer, the paste was printed in a size with a diameter of 6 mm on a central part of a YSZ solid electrolyte plate.

After the printing, the solid electrolyte plate was placed in an atmospheric furnace and the paste was burned at 1,300° C. for 2 hours. Subsequently, a platinum electrode was likewise deposited by printing on the opposite side of the solid electrolyte plate and burned at 950° C. for 1 hour to obtain an air electrode. The same meshy wiring as that shown in Comparative Example 2 was formed by printing on a surface layer part of the fuel electrode produced.

<Cell Characteristics Evaluation Test>

Each flat cell produced was set on an SOFC output characteristics evaluation apparatus, and the fuel electrode side and the air electrode side each were sealed with a Pyrex® glass material. A platinum wire having a diameter of 0.1 mm was attached as a reference electrode to a side of the electrolyte plate. The cell was heated in an argon atmosphere. Thereafter, hydrogen was introduced into the fuel electrode to conduct a reduction treatment. In Comparative Examples 1 to 3, the treatment was conducted at 900° C. for 1 hour. In Examples 1 to 6 and Comparative Example 4, the treatment was conducted at 1,000° C. for 10 minutes.

Subsequently, $H_2+H_2O$ were introduced into the fuel electrode at 50 cc/min, and dry air+argon were introduced into the air electrode at 50 cc/min (dry air, 10 cc/min; argon, 40 cc/min). Thus, the cell was evaluated for output characteristics. Furthermore, an impedance measurement was made by the current interruption method.

An explanation is made on the results. The thickness of each electrode layer formed through one screen printing operation was about 20 μm. The results of the X-ray diffraction test revealed that in Comparative Examples 1 to 3, the components of the fuel electrode after the reduction were nickel and SDC. In contrast, in Examples 1 to 6 and Comparative Example 4, peaks attributable to SDC and $NiAl_2O_4$ were detected in the composition before the reduction, and peaks attributable to SDC, Ni/Co, and $Al_2O_3$ were detected in the composition after the reduction.

Figure 5:
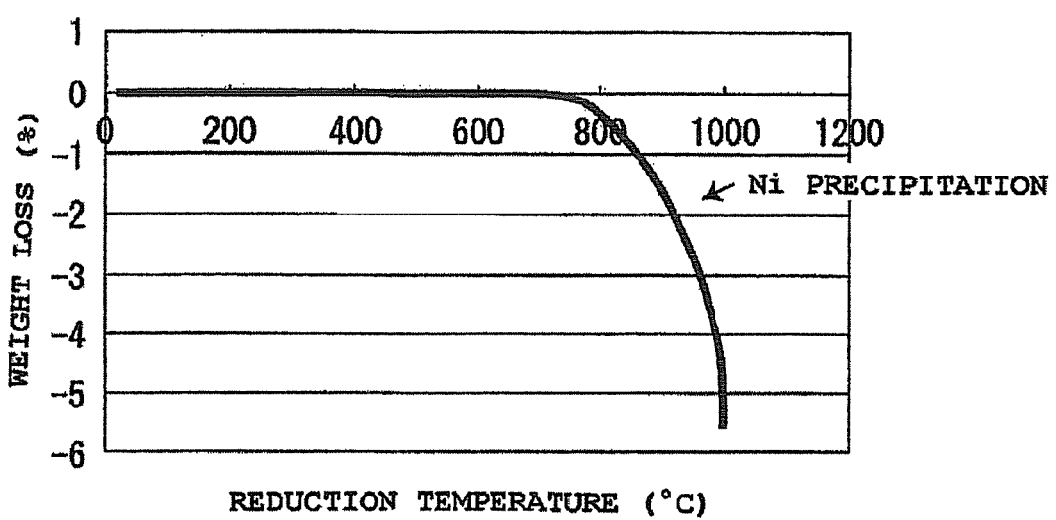
FIG. 5 is a presentation showing a change in weight of $NiAl_2O_4$ during hydrogen reduction in an Example according to the first embodiment.

The $NiAl_2O_4$ was examined with a thermo-gravimetric analyzer (TG) for weight change with reduction in hydrogen. The results obtained are shown in FIG. 5. Weight decrease, i.e., nickel precipitation, began at around 800° C., and a weight loss of about 6% was observed at 1,000° C. Reduction at 1,000° C. means that the fuel electrodes produced can be used more stably because the electrodes include metal particles precipitated at high temperatures and are used at lower temperatures.

An examination was further made with an SEM. A comparison between the results for an SDC-NiO material (Comparative Example 1) and those for an SDC-$NiAl_2O_4$ material (Example 2) is shown in FIGS. 6A, 6B and 6C. It was ascertained that in Comparative Example 1, for which NiO had been used, nickel particles having a size of about 1 μm were present among SDC particles. In contrast, in the system for which $NiAl_2O_4$ had been used, the presence of SDC particles and of $Al_2O_3$ particles having nickel particles with a diameter of from tens of nanometers to 100 nm precipitated on the surface thereof was ascertained. The nickel particles precipitated were highly dispersed on the $Al_2O_3$ without overlapping.

In Table 1 are shown the results concerning maximum output density obtained by I-V characteristics evaluation. In the table, the Catalyst precursor amount means the proportion of NiO or $NiAl_2O_4$.

TABLE 1

| | Constituent phases before reduction | Constituent phases after reduction | Catalyst precursor amount (wt %) | Meshy wiring | Output density (mW/cm$^2$) |
|---|---|---|---|---|---|
| Example 1 | NiAl$_2$O$_4$-SDC | Ni/Al$_2$O$_3$-SDC | 8 | present | 122 |
| Example 2 | NiAl$_2$O$_4$-SDC | Ni/Al$_2$O$_3$-SDC | 20 | present | 120 |
| Example 3 | NiAl$_2$O$_4$-SDC | Ni/Al$_2$O$_3$-SDC | 50 | present | 101 |
| Comparative Example 1 | NiO-SDC | Ni-SDC | 50 | absent | 120 |
| Comparative Example 2 | NiO-SDC | Ni-SDC | 50 | present | 121 |
| Comparative Example 3 | NiO-SDC | Ni-SDC | 30 | present | 90 |
| Comparative Example 4 | NiAl$_2$O$_4$-SDC | Ni/Al$_2$O$_3$-SDC | 20 | absent | 34 |
| Example 4 | NiAl$_2$O$_4$-SDC | Ni/Al$_2$O$_3$-SDC | 3 | present | 90 |
| Example 5 | NiAl$_2$O$_4$-SDC | Ni/Al$_2$O$_3$-SDC | 55 | present | 85 |
| Example 6 | CoAl$_2$O$_4$-SDC | Co/Al$_2$O$_3$-SDC | 20 | present | 105 |
| Example 7 | (Ni,Mg)O-SDC | Ni/(Ni,Mg)O-SDC | 8 | present | 124 |
| Example 8 | (Ni,Mg)O-SDC | Ni/(Ni,Mg)O-SDC | 20 | present | 123 |
| Example 9 | (Ni,Mg)O-SDC | Ni/(Ni,Mg)O-SDC | 50 | present | 99 |
| Comparative Example 5 | (Ni,Mg)O-SDC | Ni/(Ni,Mg)O-SDC | 20 | absent | 35 |
| Comparative Example 6 | (Ni,Mg)O-SDC | Ni/(Ni,Mg)O-SDC | 3 | present | 98 |
| Comparative Example 7 | (Ni,Mg)O-SDC | Ni/(Ni,Mg)O-SDC | 55 | present | 85 |
| Example 10 | (Co,Mg)O-SDC | Co/(Co,Mg)O-SDC | 20 | present | 108 |

As apparent from Table 1, in the case of the NiO-SDC systems, which are conventional materials, output characteristics tended to decrease with decreasing nickel amount. This may be because a decrease in nickel amount results in difficulties in forming electron-conducting paths. In contrast, in the Examples, output characteristics tended to improve even with small nickel amounts. This is thought to be mainly because the amount of Al$_2$O$_3$, which is an insulator, decreased and this resulted in reduced internal resistance of the electrode and also in an enlargement of SDC paths, which conduct oxygen ions. Conversely speaking, the electrodes have sufficiently high catalytic activity even with small nickel amounts.

It was further found that the formation of a meshy wiring on a surface layer part by printing was highly effective in the SDC-NiAl$_2$O$_4$ systems although it exerted almost no influence in the conventional SDC-NiO systems. Namely, in the techniques according to the Examples, in which NiAl$_2$O$_4$ is used, contact with the current collector for current collection is important although catalytic activity improves with reducing catalyst size. It has become obvious that the formation of a meshy wiring on a surface layer part by printing is highly effective in reducing the loss to be caused by current collection contact resistance.

It can be seen from those results that output characteristics equal to or higher than those of conventional materials can be imparted with smaller catalyst amounts according to the Examples. This is thought to be mainly caused by an increased amount of three-phase interfaces due to the catalyst particle size reduction and the resultant increase in catalytic activity.

In the SDC-NiO materials shown in Comparative Examples 1 to 3, the nickel particles in the materials before a power generation test had a size of about 1 μm. However, after a 300-hour power generation test at 900° C., a decrease in output density of about 25% was observed. In the structure of each of these materials which had undergone the test, it was observed that the nickel particles had grown (sintered) into particles larger than a two-fold size.

In contrast, the electrode catalysts of the Examples had not undergone the uniting of nickel particles although slight particle growth was observed. No decrease in output density was also observed. Namely, the results obtained show that the catalysts are more effective also from the standpoint of durability. This is attributable to the fact that these catalysts were synthesized at a higher temperature than the conventional NiO-based materials, and means that the catalysts according to the first embodiment have excellent thermal stability.

Also in the case of using a cobalt-aluminum composite oxide as a precursor, cobalt particle precipitation occurred and the same electrode catalyst effects were ascertained.

Furthermore, cells employing the fuel electrodes according to the Examples in combination with various air electrodes were found to show satisfactory output performance. As air-electrode materials, use can be made of, for example, one represented by the general formula Ln$_{1-x}$A$_x$BO$_{3-\delta}$ (wherein Ln is a rare-earth element; A is Sr, Ca, or Ba; and B is at least one of Cr, Mn, Fe, Co, and Ni), such as (La, Sr)(Co, Fe)O$_3$, besides platinum electrodes. Ionically conductive particles such as CeO$_2$ doped with Sm$_2$O$_3$, CeO$_2$ doped with Gd$_2$O$_3$, or CeO$_2$ doped with Y$_2$O$_3$ may be further added to those air-electrode materials. A fuel cell system produced from one or more cells employing such a combination was ascertained to have high durability and show high-performance power-generating properties. Such cells can be extensively applied not only to the flat type but also to the cylindrical type and fuel-electrode-supported type.

Second Embodiment

A second embodiment of the invention relates to the fuel electrode according to the second aspect of the invention and the process for producing this fuel electrode. The fuel electrode which will be explained below can be applied to solid oxide electrochemical cells including the solid oxide fuel cell explained by reference to FIG. 1.

Figure 7:
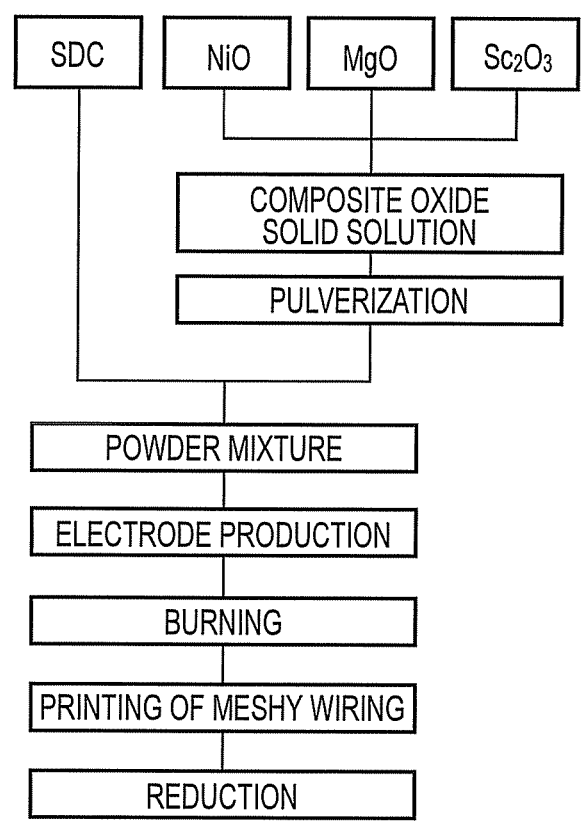
FIG. 7 is a flowchart showing steps for producing the fuel electrode according to a second embodiment of the invention.

An example of production steps for use in this embodiment is explained by reference to FIG. 7. In this example, nickel is used as a catalyst.

First, an NiO powder, an MgO powder, and a slight amount of an Sc$_2$O$_3$ powder are mixed together, and the mixture is burned to produce an MgO—NiO solid solution. Because the $Sc_2O_3$ amount is slight, the $Sc^{3+}$ ions are finally incorporated in the solid solution. When this nickel-magnesium composite oxide solid solution is reduced at 800-1,000° C., more preferably at a temperature of from 900° C. to 1,000° C., nickel particles having a size of tens of nanometers precipitate on the surface. Thus, the solid solution becomes a composite including a magnesium-based oxide having fine nickel particles supported thereon.

Other examples of such systems which form a solid solution with magnesium oxide and from which fine metal particles precipitate upon reduction include a CoO—MgO solid solution system. In this system also, the precipitation of metal particles can be accelerated with a slight amount of an additive element. Examples of such substances having the effect of accelerating the precipitation include $Al_2O_3$ and $Cr_2O_3$ besides $Sc_2O_3$.

An amount of about 0.01-1.0% by mole based on the magnesium-based composite oxide solid solution as a base suffices for those additive ingredients. By adding such an additive ingredient in such a slight amount, the amount of particles to be precipitated and the specific surface area of the metal can be improved by about one order of magnitude as compared with the case in which the minor ingredient is not added at all.

Subsequently, this sinter is pulverized into particles. The powder obtained by pulverization has a particle diameter of preferably from 0.5 μm to 20 μm. For producing such a powder, use may be made of a method in which an aqueous solution of a metal salt such as, e.g., a nitrate, is used to mix the ingredients and the mixture is pyrolyzed and burned to produce the target powder. The magnesium-based composite oxide solid-solution particles 19 are then mixed with particles 16 having mixed conductivity, and water is added thereto to obtain a paste.

As the material having mixed conductivity, use is made of SDC ($Sm_2O_3$-doped $CeO_2$) or GDC ($Gd_2O_3$-doped $CeO_2$). The paste is applied to a solid electrolyte 11 by screen printing, and the coating is burned by heating to a temperature which results in an elevated strength of bonding between the electrolyte 11 and the coating (FIG. 4 (a)). In general, it is preferred to burn the coating at a temperature in the range of from 1,200° C. to 1,400° C. Methods for electrode formation should not be construed at being limited to the printing method. Use may be made of a method in which the powder mixture is slurried and this slurry is applied by roller coating or spray coating to produce the electrode. Alternatively, the slurry may be formed into a sheet and then superposed. From the standpoint of gas diffusibility in the electrode, it is preferred that the electrode layer should be porous. A pore-forming material which disappears upon burning to form pores may be incorporated beforehand. Examples of the pore-forming material include organic ones such as, e.g., acrylic spherical particles.

Generally used as the solid electrolyte 11 is $ZrO_2$ stabilized with $Y_2O_3$, $Yb_2O_3$, $Sc_2O_3$, or the like. However, the solid electrolyte 11 should not be construed as being limited to that, and any solid electrolyte having high oxygen ion conductivity at temperatures of from 700° C. to 1,000° C. may be used.

A processing for heightening the efficiency of current collection, which is a feature of this embodiment, is further conducted. In a final material constitution to be obtained by the process according to this embodiment, metal particles functioning as a catalyst and having electronic conductivity are fine particles which are isolated and dispersed. It is therefore necessary to take a measure for securing sufficient contact with a current collector.

In ordinary techniques, a material capable of serving as a current collector, such as a metal mesh, is pushed against the electrode to establish contact. In this embodiment, however, a meshy wiring 21 is formed on the electrode layer by printing with a material having higher electronic conductivity than the electrode part, and this meshy wiring 21 is brought into contact with a current collector to thereby secure current collection (FIGS. 4 (b-1) and (b-2)). A line width of about 30 μm and a line-to-line distance of about 500 μm suffice for the wiring formed by printing. This wiring 21 exerts almost no influence on fuel diffusion. Although the line width, line-to-line distance, and wiring pattern are not limited to those, it is preferred that the area occupied by the wiring part should account for up to 40% of the whole electrode surface. As a material for forming the wiring through printing, a mixture of Pt, Au, Ni, Co, Fe, or the like and the material having mixed conductivity to be simultaneously used in the electrode layer, i.e., an SDC, GDC, or YDC material, is used. The two ingredients are mixed preferably in such a ratio that the proportion of the metal material is 40-90 vol % based on the whole. This is because not only such a mixing ratio improves tight contact and adhesion to the electrode layer but also the wiring itself can be expected to function as a catalyst.

The printed wiring part is burned. Thereafter, the resultant structure is subjected to a reduction treatment at a temperature of 800-1,000° C. in, e.g., a hydrogen atmosphere. Ordinary reduction treatments for fuel electrode production using NiO as a starting material are conducted at about 900° C. without using an unnecessarily high temperature because of the possibility of aggregation, etc. However, in the case of using, e.g., the nickel-magnesium composite oxide solid solution according to this embodiment, it is preferred to conduct the reduction at 900° C. or higher in order to sufficiently precipitate nickel. More preferably, the reduction is conducted at a temperature of from 950° C. to 1,000° C. Although the period of reduction is not particularly limited, about 10 minutes may suffice. Through the reduction, the metal ingredient present in the solid solution state in the magnesium composite oxide solid solution part precipitates on the surface to give a base made of a magnesium-rich composite oxide. Namely, a magnesium-based composite oxide 17 having fine metal particles supported thereon is formed.

The metal particles formed by the method described above have a size of about tens of nanometers. From the standpoint of enabling the metal particles to have high catalytic activity, the size of the precipitated metal particles is preferably regulated to about from 5 nm to 200 nm. The reasons for this are as follows. Metal particles having a size smaller than 5 nm are difficult to produce actually. Metal particles larger than 200 nm cannot be expected to produce high catalytic activity as compared with ones obtained by, e.g., the conventional reduction of NiO particles. A more preferred range of the size of the metal particles as an actual catalyst is about from 20 nm to 100 nm. This size is smaller than the conventional electrode catalyst sizes by one to two orders of magnitude.

The amount of the magnesium-based composite oxide solid solution to be added in constituting the electrode is preferably in the range of from 5% by weight to 50% by weight. More preferably, the amount thereof is from 10% by weight to 30% by weight. In the process according to this embodiment, magnesium-based particles having insulating properties remain even after the reduction treatment and, hence, it is undesirable to add this part in a large amount. Because activity is improved by reducing catalyst size, the amount of the composite oxide solid solution to be added can be reduced accordingly. As a result, the proportion of the material having mixed conductivity, which is more akin in properties (e.g., the coefficient of thermal expansion) to the solid electrolyte as a base, increases and the difference due to mismatch can be further reduced.

The fine metal particles precipitated are present on a surface part of the magnesium-based composite oxide as a base so as to form only one layer. These particles have satisfactory conformability to the base and are tenaciously bonded thereto. Consequently, the fine metal particles are characterized in that even when exposed to a high-temperature reducing atmosphere, the particles do not readily move.

In addition, since the metal particles present are fine and isolated, this fuel electrode has an advantage that even when the electrode layer undergoes abrupt oxidation, the resultant volume expansion is only local and is less apt to lead to breakage.

In JP-A 6-111829, a solid solution having a magnesium oxide content regulated to 5-25% by mole is used, i.e., a nickel-rich region is employed. This is intended to take account of electronic conductivity. Because of such conditions, the amount of nickel to be precipitated changes considerably with changing reduction temperature and the nickel particles are apt to aggregate/unite with one another. In this respect, in the process according to this embodiment, nickel particles retaining a small particle diameter can be precipitated on the surface of the NiO—MgO solid solution without fail, although the amount of the nickel is small. The fuel electrode thus produced is free from the fear of decreasing in catalytic performance even when used over long.

As described above, in producing a fuel electrode according to this embodiment, fine nickel particles can be fixed to a base. In addition, according to this fuel electrode, high activity and long-term stability can be provided with a small nickel addition amount. When this fuel electrode is used in combination with an air electrode employing a preferable electrode catalyst, inexpensive high-output cells which may be not only a flat cell but also a cylindrical or electrode-supported cell or the like can be realized.

The nickel-particle-supporting composite oxide (Ni, Mg)O produced by reducing NiO—MgO is usable also as a catalyst for the reforming of hydrocarbon fuels including methane. Namely, it is applicable to a variety of fuels.

The second embodiment is explained below in more detail by reference to Examples. Electrodes employing SDC as oxide particles having mixed conductivity, ones employing GDC as such oxide particles, and ones employing YDC as such oxide particles all showed the same tendency. Consequently, in the following Examples, cells employing SDC as an example are explained. Likewise, the particle diameter and other properties of each of the powders used should not be construed as being limited to those shown below.

<Solid Electrolyte>

In all Examples and Comparative Examples, YSZ ($ZrO_2$ stabilized with 8 mol % $Y_2O_3$) processed so as to have a diameter of 15 mm and a thickness of 500 μm was used as a solid electrolyte.

Examples 7 to 9

An NiO powder having an average particle diameter of about 1 μm, an MgO powder having an average particle diameter of about 1 μm, and an $Sc_2O_3$ powder were weighed out in such amounts as to result in a molar ratio of 1:2:0.2. The powders were mixed together by means of a mortar. The resultant powder mixture was press-molded, and the molding was sintered at 1,300° C. of 5 hours in the air. The constituent phases of the sinter obtained were examined by X-ray diffractometry. Subsequently, the sinter was pulverized and passed through a 40-μm mesh sieve to obtain a starting powder (nickel-magnesium composite oxide solid solution). The pulverized composite oxide solid-solution particles were mixed with SDC ($Sm_{0.2}Ce_{0.8}O_2$) particles having an average particle diameter of 3 μm in each of such ratios as to result in pulverized-particle proportions of 8, 20, and 50% by weight. Thus, respective powder mixtures were prepared (Examples 7 to 9).

To each of the powder mixtures was added about 40% by weight pure water. The resultant mixtures each were treated with a high-speed rotary mixer to obtain pastes. Using a screen printer, each paste was printed in a size with a diameter of 6 mm on a central part of a YSZ solid electrolyte plate. After the printing, the solid electrolyte plates were placed in an atmospheric furnace and the pastes were burned at 1,300° C. for 2 hours. Subsequently, a platinum electrode was likewise deposited by printing on the opposite side of each solid electrolyte plate and burned at 960° C. for 1 hour to obtain an air electrode. The same meshy wiring as that shown in Comparative Example 2 was formed by printing on a surface layer part of each fuel electrode produced.

Comparative Example 5

The same structure as that produced in Example 8 was produced, except that the meshy wiring on the surface layer part was omitted. Thus, the structure of Comparative Example 5 was prepared.

Comparative Examples 6 and 7

Samples were produced in the same manner as in Examples 7 to 9, except that the proportions of the nickel-magnesium composite oxide solid-solution particles were changed to 3 or 55% by weight (Comparative Examples 6 and 7, respectively). The same meshy wiring as that shown in Comparative Example 2 was formed by printing on a surface layer part of each fuel electrode produced.

Example 10

MgO was mixed with CoO and with $Sc_2O_3$ as an additive for accelerating cobalt precipitation, in a molar ratio of 1:2:0.2. The resultant mixture was burned at 1,300° C. to obtain a cobalt-magnesium composite oxide solid solution. This solid solution was pulverized to produce a fuel electrode in the same manner as in Example 7, and a wiring was formed by printing on a surface layer part of the electrode in the same manner.

<Cell Characteristics Evaluation Test>

Each flat cell produced was set on an SOFC output characteristics evaluation apparatus, and the fuel electrode side and the air electrode side each were sealed with a Pyrex® glass material. A platinum wire having a diameter of 0.1 mm was attached as a reference electrode to a side of the electrolyte plate. The cell was heated in an argon atmosphere. Thereafter, hydrogen was introduced into the fuel electrode to conduct a reduction treatment. With respect to Examples 7 to 10 and Comparative Examples 5 to 7, the reduction was conducted at 1,000° C. for 10 minutes.

Subsequently, $H_2+H_2O$ were introduced into the fuel electrode at 50 cc/min, and dry air+argon were introduced into the air electrode at 50 cc/min (air electrode: dry air, 10 cc/min; argon, 40 cc/min). Thus, the cell was evaluated for output characteristics. Furthermore, an impedance measurement was made by the current interruption method.

An explanation is made on the results below. The thickness of each electrode layer formed through one screen printing operation was about 20 µm. The results of the X-ray diffraction test are as follows. In Examples 7 to 10 and Comparative Examples 5 to 7, peaks attributable to SDC and an (Ni, Mg)O-based or (Co, Mg)O-based solid solution were detected in the composition before the reduction, while peaks attributable to SDC, nickel, and an (Ni, Mg)O-based solid solution or peaks attributable to SDC, cobalt, and a (Co, Mg)O-based solid solution were detected in the composition after the reduction.

Figure 8:
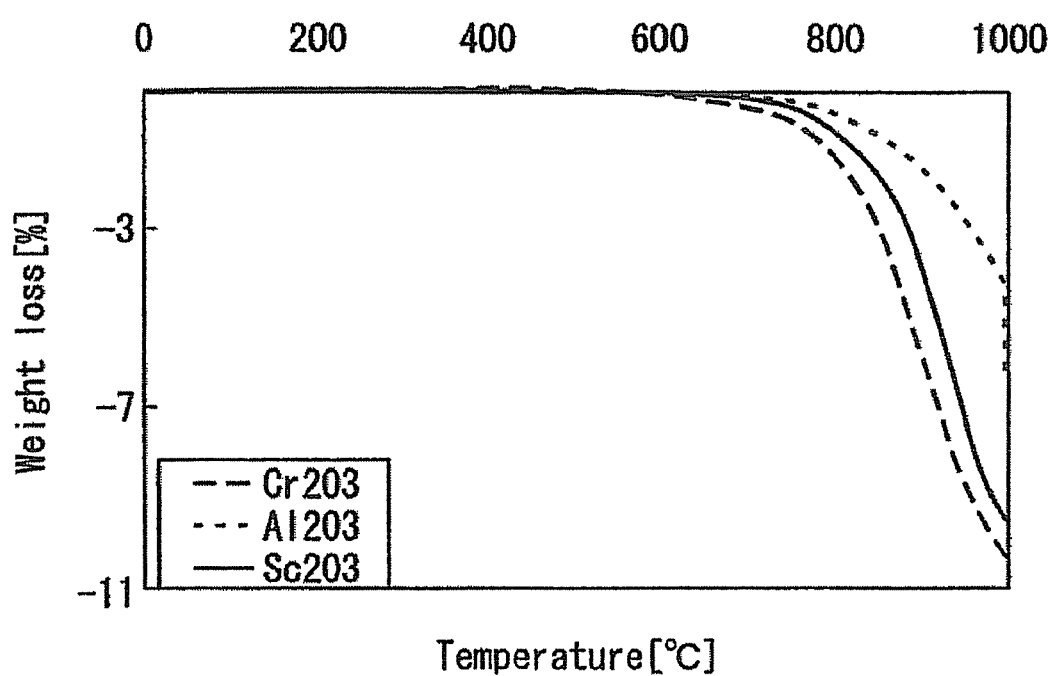
FIG. 8 is a presentation showing changes in weight of nickel-magnesium composite oxide solid solutions during hydrogen reduction in an Example according to the second embodiment.

The nickel-magnesium composite oxide solid solutions were examined with a thermo-gravimetric analyzer (TG) for weight change with reduction in hydrogen. The results obtained are shown in FIG. 8. The addition of each of $Sc_2O_3$, $Cr_2O_3$, and $Al_2O_3$ in a slight amount brought about a large weight loss. The MgO—NiO composite oxide solid solution to which none of these additives had been added had a reduction loss at 1,000° C. of about 0.5%. It can hence be seen that the addition of the additives accelerated the reduction (nickel precipitation). Reduction at 1,000° C. means that the fuel electrodes produced can be used more stably because the electrodes include metal particles precipitated at high temperatures and are used at lower temperatures.

Figure 9:
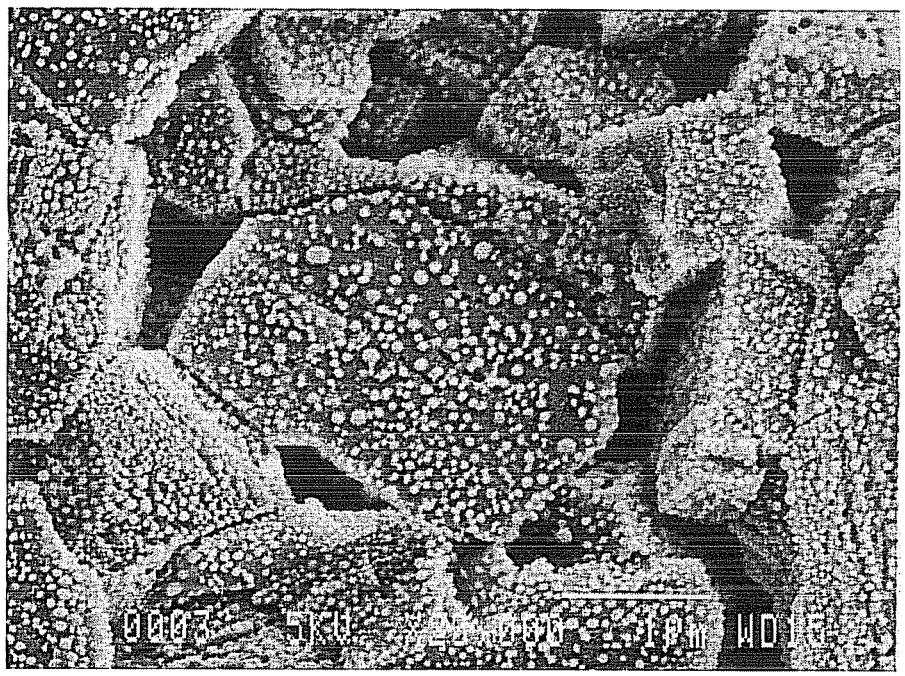
FIG. 9 is an SEM photograph of a reduced nickel-magnesium composite oxide in an Example according to the second embodiment.

A structure examination was further made with an SEM. As a result, it was ascertained that in Comparative Example 1, for which NiO had been used, nickel particles having a size of about 1 µm were present among SDC particles. In contrast, in each of the systems for which NiO—MgO had been used, nickel particles of a size of from tens of nanometers to about 100 nm precipitated on the surface of the magnesium-based composite oxide particles were ascertained (FIG. 9). Although this figure shows an example for which $Sc_2O_3$ had been used, the case of adding $Cr_2O_3$ or $Al_2O_3$ gave the same structure. A measurement of specific surface area revealed that the nickel particles had been precipitated in an amount about 10 times the nickel particle amount in the material obtained by reducing an NiO—MgO composite oxide solid solution containing no additive. In addition, the nickel particles precipitated were highly dispersed on the magnesia solid-solution particles without overlapping and were mostly in contact with SDC particles as a base.

In Table 1 are shown the results concerning output density obtained by I-V characteristics evaluation. In the table, the catalyst precursor amount means the proportion of NiO or of MgO—NiO solid-solution particles.

In the processes according to the Examples, output characteristics tended to improve even with small nickel amounts. This is thought to be attributable to the following. The nickel-magnesium composite oxide solid solution serving as a nickel-supporting base had almost no electronic conductivity and, hence, the internal resistance of the electrodes could be reduced by adding the solid solution in a reduced amount. In addition, the reduced solid-solution amount resulted in an increased amount of SDC paths, which conduct oxygen ions. Conversely speaking, the electrodes have sufficiently high catalytic activity even with small nickel amounts.

It was further found that the formation of a meshy wiring on a surface layer part by printing was highly effective. Namely, in the techniques according to the Examples, in which (Ni, Mg)O was used as a catalyst precursor, contact with the current collector for current collection was important although catalytic activity improved with decreasing catalyst size. It has become obvious that the formation of a meshy wiring on a surface layer part by printing is highly effective in reducing the loss to be caused by current collection contact resistance.

It can be seen from those results that output characteristics equal to or higher than those of conventional materials can be imparted with smaller catalyst amounts according to the Examples. This is thought to be mainly caused by an increased amount of three-phase interfaces due to the catalyst particle size reduction and the resultant increase in catalytic activity. Furthermore, it was ascertained that because nickel particles had been precipitated by conducting a reduction treatment at 1,000° C., the fuel electrodes underwent especially no structural change (uniting or growth of nickel particles) with the lapse of time even when continuously used at a temperature of 900° C. or higher.

The electrode catalysts of the Examples had not undergone the uniting of nickel particles although slight particle growth was observed. No decrease in output density was also observed. Namely, the results obtained show that the catalysts are more effective also from the standpoint of durability. This is attributable to the fact that these catalysts were synthesized at a higher temperature than the conventional NiO-based materials, and means that the catalysts according to the second embodiment have excellent thermal stability.

Also in the case of using a cobalt-magnesium composite oxide solid solution as a precursor, almost the same effects as in the case of using the nickel system were ascertained to be obtained when $Sc_2O_3$, $Al_2O_3$, or $Cr_2O_3$ was used as a minor additive.

Furthermore, cells employing the fuel electrodes according to the Examples in combination with various air electrodes were found to show satisfactory output performance. As an air-electrode material, use can be made of, for example, one represented by the general formula $Ln_{1-x}A_xBO_{3-\delta}$ (wherein Ln is a rare-earth element; A is Sr, Ca, or Ba; and B is at least one of Cr, Mn, Fe, Co, and Ni), such as (La, Sr)(Co, Fe)$O_3$; this material may be disposed over the electrolyte plate through an SDC layer having a thickness of 1 µm as a reaction-inhibitive layer for inhibiting reaction with the electrolyte. Ionically conductive particles such as $CeO_2$ doped with $Sm_2O_3$, $CeO_2$ doped with $Gd_2O_3$, or $CeO_2$ doped with $Y_2O_3$ may be further added to those air-electrode materials. A fuel cell system produced from one or more cells employing such a combination was ascertained to have high durability and show high-performance power-generating properties. Such cells can be extensively applied not only to the flat type but also to the cylindrical type and fuel-electrode-supported type.

The aluminum-based composite oxide solid solution or magnesium-based composite oxide solid solution which comes to support fine metal particles, which was used in the embodiments described above, is useful also as a catalyst for the reforming of hydrocarbon fuels including methane. This solid solution is hence expected to be applied to techniques concerning SOFCs of the internal reforming type.

The aluminum-based composite oxide solid solution and/or magnesium-based composite oxide solid solution which comes to support fine metal particles according to the embodiments of the invention was applied to the fuel electrode (steam electrode) of an electrolytic cell (SOEC) for electrolyzing steam to take out hydrogen. As a result, it was ascertained that the cell efficiently electrolyzed steam to yield hydrogen and that the cell showed characteristics with little metal particle growth and excellent durability.

The nickel-aluminum-based composite oxide sinter particles (19) or nickel-magnesium-based composite oxide particles (19), which are catalyst precursors, take a remarkable effect for making the output density improve, when the specific surface area thereof is set within the range of 5 m²/g or larger and preferably from 10 to 30 m²/g. The larger the specific surface area of the particles, that is, the smaller the particle diameter thereof, the larger the amount of the metal fine particles exposed on the surface thereof after conducting the reduction. Accordingly, because the amount of the effective metal fine particles which can be used as reactive sites is increased, the output density is improved. However, when the specific surface area exceeds 30 m$^2$/g, because the sinter density of a material constituting the fuel electrode is increased and there is a possibility that the dispersion path for water vapor to be formed by a reaction may be curbed, it is necessary to device a countermeasure such as an addition of pore-forming material to the constitution material.

Further, it is likewise preferable that the ionically conductive particles ion to be combined with the above-described composite oxide sinter particles have the specific surface area of 5 m$^2$/g or larger. This is effective in forming a large number of contact sites (reactive sites) with the metal fine particles deposited by conducting the reduction. Further, the above-described ionically conductive particles may be prepared by mixing a plurality of particles having particle sizes different in the specific surface areas with each other and used in order to effectively form an ion conduction path. As described above, the improvement of the catalytic activity by increasing the reactive sites results in the decrease in the overvoltage and as a results the output density is improved.

Example 11

The nickel-aluminum-based composite oxide sinter particles which were obtained by mixing the NiO powder and the Al$_2$O$_3$ powder in a molar ratio of 1:1 and sintering the resulting mixture in Example 1 were further pulverized by means of a planetary ball mill to obtain powders having the specific surface area of 20.0 m$^2$/g. The thus pulverized composite oxide sinter particles and SDC (Sm$_{0.2}$Ce$_{0.8}$O$_2$) particles having an average particle diameter of 0.3 μm and the specific surface area of 6.2 m$^2$/g were weighed out in such amounts as to result in a weight ratio of 20:80. The powders were mixed together.

Pure water was added to the mixed powders in an amount of about 40% based on the total weight thereof. The resultant mixture was treated with a high-speed rotary mixer to obtain a paste. Using a screen printer, the paste was printed in a size with a diameter of 6 mm on a central part of a YSZ solid electrolyte plate. After the printing, the solid electrolyte plate was placed in an atmospheric furnace and the paste was burned at 1,300° C. for 2 hours. Thereafter, a platinum electrode likewise having a diameter of 6 mm was deposited on the opposite side by screen printing and burned at 950° C. for 1 hour to obtain an air electrode. The same meshy wiring as that shown in Example 1 was formed by printing on a surface layer part of the fuel electrode produced.

Example 12

The nickel-aluminum-based composite oxide sinter particles used in Example 11 which were pulverized so as to have the specific surface area of 20.0 m$^2$/g and the SDC (Sm$_{0.2}$Ce$_{0.8}$O$_2$) particles which were likewise pulverized so as to have the specific surface area of 26.7 m$^2$/g were weighed out in such amounts as to result in a weight ratio of 20:80. The powders were mixed together.

Pure water was added to the mixed powders in an amount of about 40% based on the total weight thereof. The resultant mixture was treated with a high-speed rotary mixer to obtain a paste. Using a screen printer, the paste was printed in a size with a diameter of 6 mm on a central part of a YSZ solid electrolyte plate. After the printing, the solid electrolyte plate was placed in an atmospheric furnace and the paste was burned at 1,300° C. for 2 hours. Thereafter, a platinum electrode likewise having a diameter of 6 mm was deposited on the opposite side by screen printing and burned at 950° C. for 1 hour to obtain an air electrode. The same meshy wiring as that shown in Example 1 was formed by printing on a surface layer part of the fuel electrode produced.

An explanation is made on the results. In Example 11, the output density in the fuel electrode half cell constituted of the mixed phase of the nickel-aluminum-based composite oxide sinter particles (NiAl$_2$O$_4$ particles) the specific surface area of which was increased to 20.0 m$^2$/g by the pulverization and the SDC powders having the specific surface area of 6.2 m$^2$/g was 140 mW/cm$^2$. Even when the particle size of the nickel-aluminum-based composite oxide sinter particles is decreased, the size of nickel particles deposited on the surface of the composite oxide sinter particles after conducting the reduction hardly be changed. Accordingly, when the particle size of the nickel-aluminum-based composite oxide sinter particles which are catalyst precursors is reduced, because the contact sites of the metal particles exposed on the surface thereof with the SDC particles which are the ionically conductive particles are increased, it is possible to make the catalytic activity improve.

In Example 12, the output density in the fuel electrode half cell constituted of the mixed phase of the nickel-aluminum-based composite oxide sinter particles (NiAl$_2$O$_4$ particles) the specific surface area of which was increased to 20.0 m$^2$/g by the pulverization and the SDC powders having the specific surface area of 26.7 m$^2$/g was 145 mW/cm$^2$. When the overvoltage due to only the fuel electrode except the overvoltage due to the electrolyte resistance was investigated, the effect of remarkably reducing the overvoltage at the low to medium electrical current density region was taken. On the other hand, the overvoltage was slightly increased at the high electrical current density region. In this region, the overvoltage due to the dispersion condition of the reaction gas was shown. Because the particle sizes of both particles were reduced, the density of the fuel electrode was increased. That is, because the pores are decreased, there is a possibility that the dispersion of gas might be insufficient. Under the circumstances, the increase in the density of the fuel electrode can be controlled by introducing the pore-forming material and the like.

What is claimed is:

1. A fuel electrode for an electrochemical cell comprising: an electrode layer comprising a mixed phase constituted of an oxide having mixed conductivity selected from the group consisting of CeO$_2$ doped with Sm$_2$O$_3$, CeO$_2$ doped with Gd$_2$O$_3$, and CeO$_2$ doped with Y$_2$O$_3$ and another oxide selected from the group consisting of: an aluminum-based composite oxide and a magnesium-based composite oxide, the another oxide having bonded to a surface part thereof, particles of at least one member selected from nickel, cobalt, and nickel-cobalt alloys.

2. The fuel electrode of claim 1, wherein the particles have an average particle diameter of from 5 nm to 200 nm.

3. The fuel electrode of claim 1 wherein the oxide having mixed conductivity is in mixture, in a ratio of from 50:50 to 95:5 by weight, with one of nickel-aluminum composite oxide particles or cobalt-aluminum composite oxide particles.

4. The solid oxide electrochemical cell fuel electrode of claim 1 wherein the oxide particles having mixed conductivity are a is in mixture, in a ratio of from 50:50 to 95:5 by weight, with composite oxide particles composed of both a nickel-aluminum composite oxide and a cobalt-aluminum composite oxide.

5. The fuel electrode of claim 1 wherein the oxide having mixed conductivity is in mixture, in a ratio of from 50:50 to 95:5 by weight, with one of nickel-magnesium composite oxide particles or cobalt-magnesium composite oxide particles.

6. The fuel electrode of claim 1, wherein the oxide particles having mixed conductivity are a is in mixture, in a ratio of from 50:50 to 95:5 by weight, with composite oxide particles composed of both a nickel-magnesium composite oxide and a cobalt-magnesium composite oxide.

7. A solid oxide electrochemical cell including:
a solid electrolyte plate having oxygen ion conductivity;
a fuel electrode formed on one side of the solid electrolyte plate, the fuel electrode comprising:
an electrode layer comprising a mixed phase constituted of an oxide having mixed conductivity selected from the group consisting of $CeO_2$ doped with $Sm_2O_3$, $CeO_2$ doped with $Gd_2O_3$, and $CeO_2$ doped with $Y_2O_3$ and another oxide selected from the group consisting of; an aluminum-based composite oxide and a magnesium-based composite oxide, the another oxide having, bonded to a surface part thereof, particles of at least one member selected from nickel, cobalt, and nickel-cobalt alloys; and
an air electrode formed on the other side of the solid electrolyte plate, the air electrode comprising a composite oxide represented by $Ln_{1-x}A_xBO_{3-\delta}$, wherein Ln is a rare-earth element; A is Sr, Ca, or Ba; and B is at least one of Cr, Mn, Fe, Co, and Ni, or comprising a composite phase constituted of the composite oxide represented by $Ln_{1-x}A_xBO_{3-\delta}$ and at least one of $CeO_2$ doped with $Sm_2O_3$, $CeO_2$ doped with $Gd_2O_3$, and $CeO_2$ doped with $Y_2O_3$.

8. The solid oxide electrochemical cell of claim 7, wherein the particles have an average particle diameter of from 5 nm to 200 nm.

9. The solid oxide electrochemical cell of claim 7 wherein the oxide having mixed conductivity is in mixture, in a ratio of from 50:50 to 95:5 by weight, with one of nickel-aluminum composite oxide particles or cobalt-aluminum composite oxide particles.

10. The solid oxide electrochemical cell of claim 7 wherein the oxide particles having mixed conductivity is in mixture, in a ratio of from 50:50 to 95:5 by weight, with composite oxide particles composed of both a nickel-aluminum composite oxide and a cobalt-aluminum composite oxide.

11. The solid oxide electrochemical cell of claim 7 wherein the oxide having mixed conductivity is in mixture, in a ratio of from 50:50 to 95:5 by weight, with one of nickel-magnesium composite oxide particles or cobalt-magnesium composite oxide particles.

12. The solid oxide electrochemical cell of claim 11 wherein the nickel-magnesium composite oxide particles and the cobalt-magnesium composite oxide particles contain at least one element selected from the group of Sc, Al, and Cr, wherein the at least one element is present in an amount from 0.01% by mole to 1.0% by mole based on the magnesium-based composite oxides.

13. The solid oxide electrochemical cell of claim 7 wherein the oxide particles having mixed conductivity are a is in mixture, in a ratio of from 50:50 to 95:5 by weight, with composite oxide particles composed of both a nickel-magnesium composite oxide and a cobalt-magnesium composite oxide.

14. The solid oxide electrochemical cell of claim 13 wherein the nickel-magnesium composite oxide particles and the cobalt-magnesium composite oxide particles contain at least one element selected from the group of Sc, Al, and Cr, wherein the at least one element is present in an amount from 0.01% by mole to 1.0% by mole based on the magnesium-based composite oxides.

* * * * *